US010955676B2

(12) United States Patent
Schultz

(10) Patent No.: US 10,955,676 B2
(45) Date of Patent: *Mar. 23, 2021

(54) HEAD MOUNTED IMAGING APPARATUS WITH OPTICAL COUPLING

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,668

(22) Filed: Jul. 11, 2019

(65) Prior Publication Data

US 2019/0361242 A1    Nov. 28, 2019

Related U.S. Application Data

(63) Continuation of application No. 15/537,045, filed as application No. PCT/US2016/012379 on Jan. 6, 2016, now Pat. No. 10,359,632.

(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0031* (2013.01);
(Continued)

(58) Field of Classification Search
CPC ............ G02B 27/0172; G02B 27/0176; G02B 6/0038; G02B 6/0031; G02B 6/0016;
(Continued)

(56) References Cited

U.S. PATENT DOCUMENTS

| 5,453,877 A | 9/1995 | Gerbe et al. |
| 8,760,762 B1 | 6/2014 | Kelly et al. |

(Continued)

FOREIGN PATENT DOCUMENTS

| EP | 2065751 A2 | 11/2008 |
| EP | 2065750 A3 | 6/2009 |

(Continued)

OTHER PUBLICATIONS

International Search Report and Written Opinion from corresponding International Application No. PCT/US2016/012379 dated Mar. 18, 2016.

(Continued)

*Primary Examiner* — Marin Pichler
*Assistant Examiner* — Henry A Duong
(74) *Attorney, Agent, or Firm* — Thomas B. Ryan; Jacob D. Merrell, Esq.; Harter Secrest & Emery LLP

(57) ABSTRACT

A head-mounted imaging apparatus includes a frame that houses a left-eye and a right-eye imaging apparatus. Each imaging apparatus forms a virtual image to an eye of an observer and includes a projector, a planar waveguide, and an optical coupler. The projector is supported by a temple member of the frame and emits a central projected light beam along a projection axis. The planar waveguide accepts the projected light beam through an input aperture and forms an expanded light beam that is output from an output aperture and directed toward the observer's eye. The optical coupler receives the central projected light beam along a first axis that is at an obtuse angle with respect to the waveguide surface, and the optical coupler redirects the central projected light beam along a second axis that is at an acute angle with respect to the waveguide surface.

16 Claims, 7 Drawing Sheets

Related U.S. Application Data

(60) Provisional application No. 62/100,346, filed on Jan. 6, 2015.

(52) U.S. Cl.
CPC ....... *G02B 6/0038* (2013.01); *G02B 27/0176* (2013.01); *G02B 2027/015* (2013.01); *G02B 2027/0118* (2013.01); *G02B 2027/0123* (2013.01); *G02B 2027/0132* (2013.01); *G02B 2027/0178* (2013.01)

(58) Field of Classification Search
CPC .... G02B 2027/0132; G02B 2027/0118; G02B 2027/0178; G02B 2027/015; G02B 2027/0123; G02B 5/18; G02B 5/1847; G02B 5/188; G02B 2005/1804
USPC .......................................................... 359/567
See application file for complete search history.

(56) References Cited

U.S. PATENT DOCUMENTS

| | | | |
|---|---|---|---|
| 8,913,865 B1 | 12/2014 | Bennett | |
| 9,261,688 B2 | 2/2016 | Takeda et al. | |
| 2009/0279180 A1 | 11/2009 | Amitai et al. | |
| 2010/0277803 A1* | 11/2010 | Pockett | G02B 27/0172 359/567 |
| 2011/0057863 A1 | 3/2011 | Sugihara et al. | |
| 2012/0162549 A1 | 6/2012 | Gao et al. | |
| 2013/0242056 A1* | 9/2013 | Fleck | H04N 13/296 348/47 |
| 2014/0204438 A1 | 7/2014 | Yamada et al. | |
| 2014/0293434 A1* | 10/2014 | Cheng | G02B 27/225 359/630 |

FOREIGN PATENT DOCUMENTS

| | | |
|---|---|---|
| JP | 102-297516 A | 12/1990 |
| JP | 2000131614 A | 5/2000 |
| JP | 2002162598 A | 11/2000 |
| JP | 2004021078 A | 1/2004 |
| JP | 2004029544 A | 1/2004 |
| JP | 2009133998 A | 6/2009 |
| JP | 2011059444 A | 9/2009 |
| JP | 2012198392 A | 10/2012 |
| JP | 2014142386 A1 | 1/2013 |
| WO | 20080129539 A3 | 10/2008 |

OTHER PUBLICATIONS

International Preliminary Report on Patentability from corresponding International Application No. PCT/US2016/012379 dated Jul. 11, 2017.
Extended European Search Report dated Aug. 27, 2018 on European Patent Application No. EP16735373.9.
Japanese Search Report (with English translation) from corresponding JP application No. 2017-534590 dated Oct. 30, 2019.
Japanese Patent Office, Notice of Rejection (Final) in corresponding Japanese Patent Application No. 2017-534590, dated Sep. 23, 2020.

\* cited by examiner

HEAD MOUNTED IMAGING APPARATUS WITH OPTICAL COUPLING

TECHNICAL FIELD

This invention generally relates to electronic displays and more particularly relates to wearable electronic displays that form a virtual image.

BACKGROUND OF THE INVENTION

Head-Mounted Displays (HMDs), which include near eye displays in a form resembling conventional eyeglasses or sunglasses, are being developed for a range of diverse uses, including military, commercial, industrial, fire-fighting, and entertainment applications. For many of these applications, there is particular value in forming a virtual image that can be visually superimposed over the real-world image that lies in the field of view of the HMD user.

In general, HMD optics must meet a number of basic requirements for viewer acceptance, including the following:
- (i) sufficient eye relief or eye clearance. The eye relief range is defined based on viewer comfort and the optical configuration of the human eye itself. In practice, the distance between the last optical surface of the HMD optics and the viewer's eye is preferably above about 20 mm.
- (ii) appropriate pupil size. Pupil size requirements are based on physiological differences in viewer face structure as well as on gaze redirection during viewing. A pupil size of at least about 10 mm diameter has been found to be desirable.
- (iii) field of view. A wide field of view is preferable. For many visual tasks, such as targeting and object recognition, a field of view (FOV) approaching about 50 degrees is considered to be desirable.
- (iv) brightness. The virtual image that is generated should have sufficient brightness for good visibility and viewer comfort.

Aspects (i)-(iii) relate to the eyebox. The eyebox relates to the volume within which the eye of the observer can comfortably view the image. The size of the eyebox depends in part on the length of the path of the light from the image source to where the image is viewed and image source size, and in part on the divergence of the image source and/or the collimation of the light after its emission by the image source. The desirable size of the eye box depends largely on the quality of viewing experience that is desired from the display.

In addition to optical requirements, HMD designs must also address practical factors such as variable facial geometry, acceptable form factor with expectations of reduced size for wearing comfort, weight, and cost, and ease of use.

A goal for most HMD systems is to make the imaging/relay system as compact as possible; however, when using conventional optics, there are basic limits. The output of the optic system must have a pupil that is large enough to support a reasonably sized virtual image and also allow for some movement of the eye. In a binocular system there is also the issue of varying intraocular distances among different users and the need for the output pupil of the optical system to allow for this.

A number of near-eye HMD devices use planar waveguides. These devices employ a series of optical diffraction gratings and total internal reflection (TIR) to laterally translate the exit pupil of a projection system so that the projection system can be located to the side of the viewing path, such as alongside the viewer's head. Optical waveguides also expand the exit pupil in one or two dimensions so that the size of the imaged-light projection system can be reduced. This allows the exit pupil of the projection system to be quite small while enlarging the eyebox and allowing the system to be moved out of the viewer's line of site. At the same time, the waveguide can be transparent, so the virtual image can be superimposed over the ambient environment.

With the bulk of the projection optics laterally translated out of the user's view and highly compact, there is still a desire to configure the projection components to a form factor that is more consistent with glasses and thus more acceptable to a broad user population. A number of approaches have been proposed for using a prism or mirror to fold the optical path. However, the net effect has often been awkward placement of projection components, such as having these components further removed from the waveguide, increasing the dimensional requirements of the head-mounted device.

SUMMARY OF THE INVENTION

It is an object of the present disclosure to advance the art of image presentation when using compact head-mounted devices and similar imaging apparatus. Advantageously, embodiments of the present disclosure provide light coupling solutions that are not only compatible with the general form factor of eyeglasses, but allow the use of projector optics capable of providing sufficient brightness and pupil size for comfortable viewing.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided a head-mounted imaging apparatus having a frame that houses a left-eye imaging apparatus and a right-eye imaging apparatus, each imaging apparatus energizable to form a virtual image to an eye of an observer. Each imaging apparatus includes a projector, a planar waveguide, and an optical c oupler. The projector is supported by to a temple member of the frame and is energizable to emit a set of angularly related beams including a central projected light beam along a projection axis. The waveguide has two planar surfaces and is configured to accept the projected light beam at an input aperture and to form an expanded light beam that is output from an output aperture and directed toward a corresponding eye of the observer. The output aperture of the planar waveguide is spaced apart from the input aperture. The optical coupler receives the central projected light beam along a first axis that is at an obtuse angle with respect to the waveguide surfaces, and the optical coupler redirects the central projected light beam along a second axis that is at an acute angle with respect to the waveguide surfaces.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

FIG. 1 is a top schematic view showing an HMD optical apparatus according to an embodiment of the present disclosure.

FIGS. 2A, 2B, and 2C are top views showing schematically how a planar waveguide operates to translate a central light beam from an offset projector toward a viewer's eye.

DETAILED DESCRIPTION OF THE INVENTION

Figure 1:
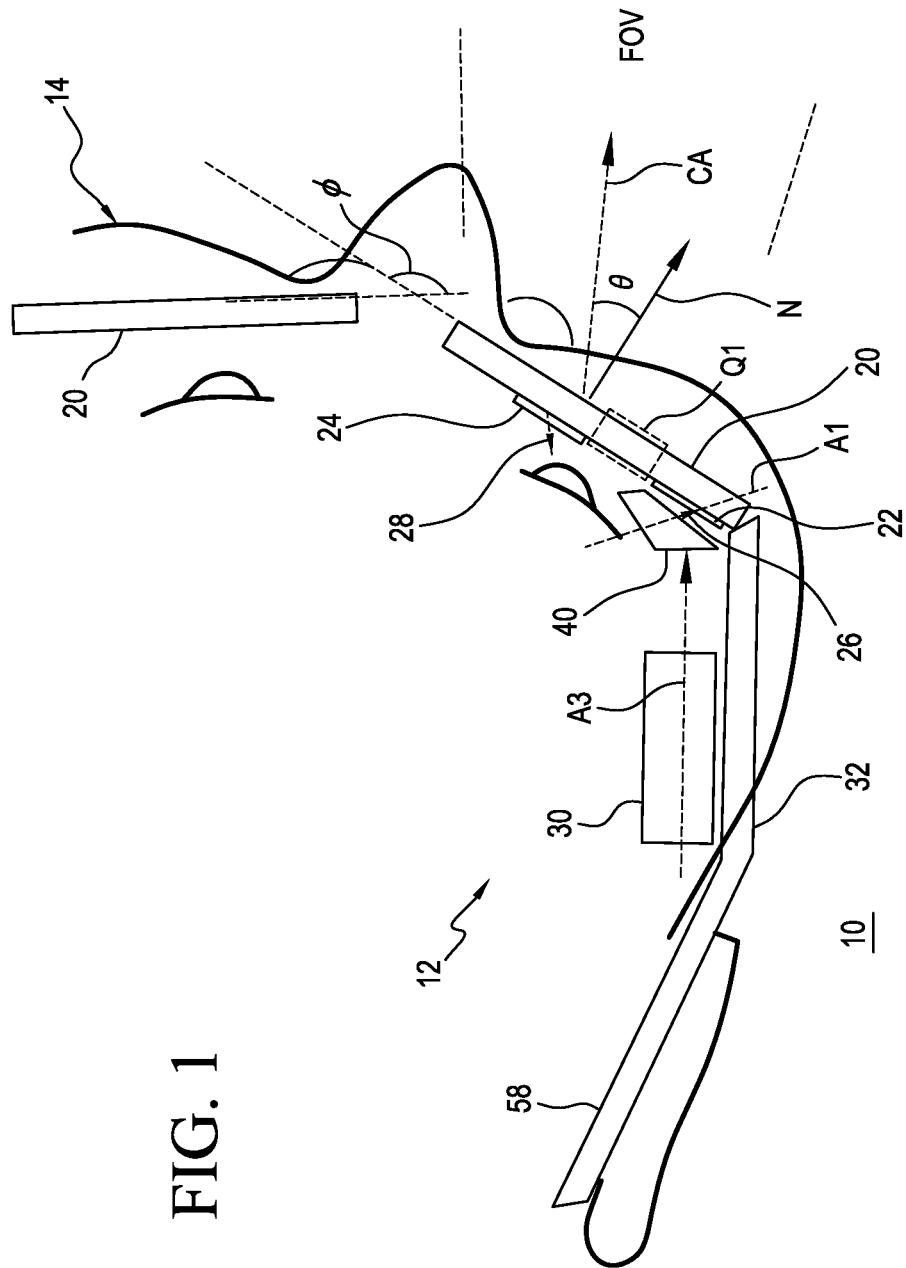

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure, such as to distinguish opposing surfaces of a planar (flat) waveguide.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

The schematic diagram of FIG. 1 shows, in top view, an HMD 10 with a frame 58 that provides a near-eye display, as the term is understood by those skilled in the wearable display arts. In the description that follows, the optical path components, spacing, and constraints are described with reference to the right eye of an observer 14 as represented in FIG. 1. The same characteristics and constraints apply for the left eye, with parallel components and corresponding changes in component positioning.

In an optical imaging apparatus 12, a planar waveguide 20 is provided for each eye of a viewer or observer 14, with the planar waveguides 20 disposed at an obtuse chevron angle 0 with respect to each other. Observer 14 has a corresponding ambient field of view (FOV) or view path through the transparent waveguide 20. The FOV is substantially centered about a center axis CA that is oblique to the planar waveguide 20. Axis CA is at an angle θ/from a normal N to waveguide 20 surface. Waveguide 20 is the last optical element provided by HMD 10 for forming the virtual image that is presented to the observer 14.

Figure 2A:
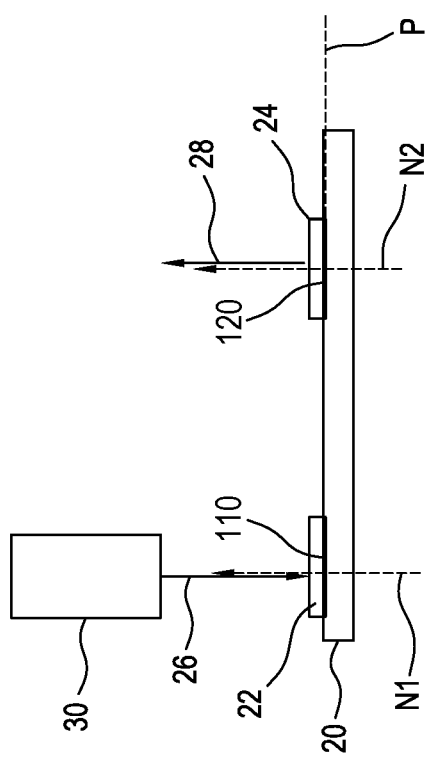
Figure 2B:
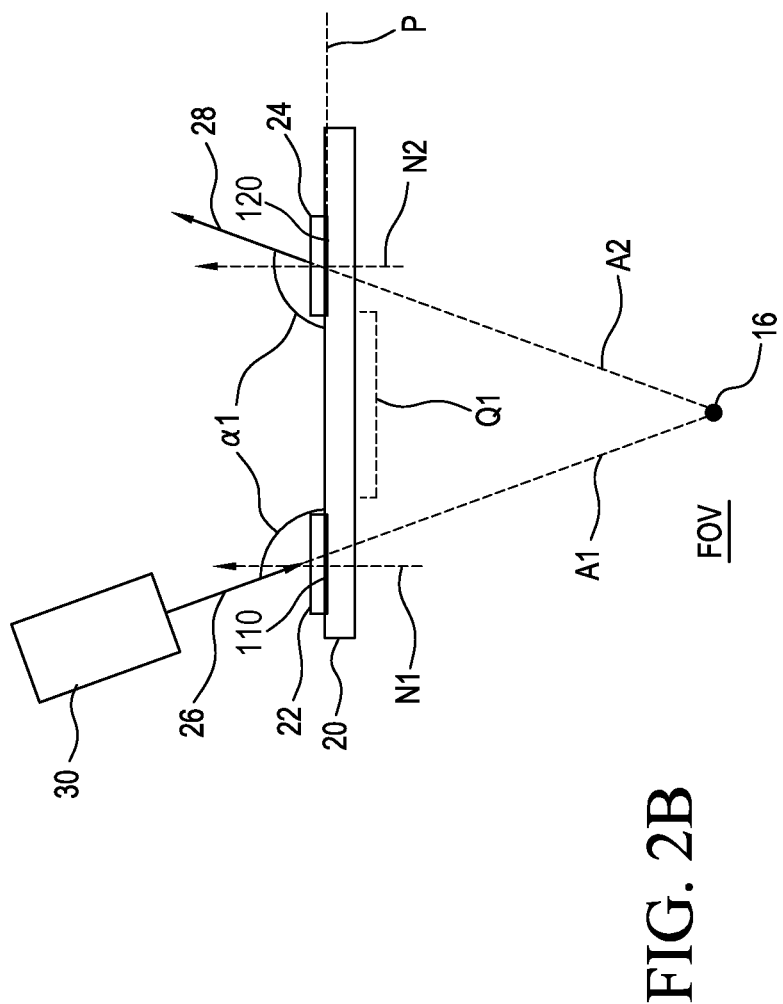
Figure 2C:
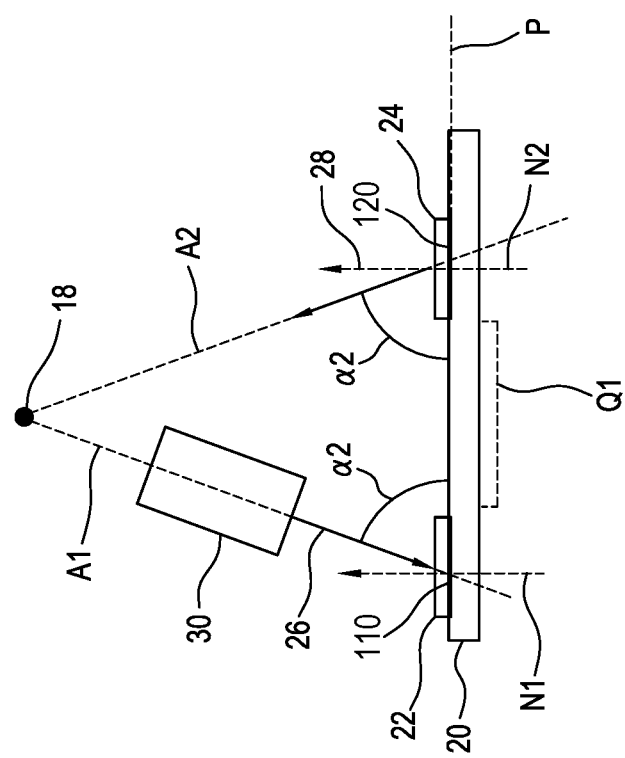

Waveguide 20 is formed of glass or other transparent optical material and has two or more embedded optical gratings that cooperate with TIR within the waveguide structure to resize and redirect imaging beams into, along and out of the waveguide 20. Here, only a central input beam 26 and a central output beam 28 are considered from a set of angularly related beams that encode an image. Waveguide 20 has characteristic behavior relative to incident input beam 26 and exiting output beam 28 as shown in FIGS. 2A, 2B, and 2C. Imaging light directed through an input aperture 22 propagates along waveguide 20, such as by total internal reflection (TIR), and exits through an output aperture 24. The periodic structure and orientation of its embedded gratings can widen the input beam in both orthogonal directions in the plane P of the waveguide surface (with plane P orthogonal to the page in the view of FIGS. 2A-2C), effectively expanding the pupil size of the image-forming optics. When an input beam 26 is directed along a normal N1 to the plane P, an output beam 28 exits along a normal N2 to the plane P, as shown in FIG. 2A. When the input beam 26 is at an oblique angle to plane P, the output beam 28 exits at a corresponding oblique angle, as shown in the examples of FIGS. 2B and 2C. In the FIG. 2B configuration, the axis AI of the input beam 26 is at an obtuse angle al with respect to a portion Q1 of the waveguide 20 surface that lies between input aperture 22 and output aperture 24. The resulting output beam 28 is oriented at the same obtuse angle al with respect to portion QI. Axis AI intersects the axis A2 of the output beam 28 at a point 16 on the outer side of waveguide 20, within the field of view FOV of the observer.

In the FIG. 2C configuration, the axis AI of the input beam 26 is at an acute angle a2 with respect to portion QI of waveguide 20 that lies between input aperture 22 and output aperture 24. The resulting output beam 28 is oriented at the same acute angle a/2 (mirrored) with respect to portion QI. Here, axis AI intersects the axis A2 of the output beam 28 on the observer side of waveguide 20, at a point 18 lying within the head of the observer.

Referring back to FIG. 1, it can be seen that in the embodiment of the HMD 10, the waveguide 20 must exhibit the behavior shown in FIG. 2C in order to form the virtual image for observer 14. That is, the input beam 26 must be oriented at an acute angle relative to the portion Q1 of waveguide 20 (shown in dashed outline) that lies between input aperture 22 and output aperture 24. With this relationship, the resulting output beam 28 is similarly oriented at an acute angle with respect to portion Q1 and thus oblique with respect to normal N from the waveguide 20 surface and the output beam 28 is directed back toward the eye. The axis of the input beam intersects the axis of the output beam on the observer side of waveguide 20, as described with reference to FIG. 2C.

As is shown in FIG. 1, a projector 30 is positioned along a portion of frame 58 of HMD 10 that is termed a temple member 32. The projector 30 is energizable to emit a central projected light beam along a projection axis A3. The output light beam from projector 30 along axis A3 is at an angle that is obtuse with respect to the surface of waveguide 20 shown as portion Q1. Thus, relative to waveguide 20, the axis A3 angular orientation is opposite the orientation that is needed for properly directing light to form the image within the eye box and needs to be redirected so that it is incident on waveguide 20 at an acute angle with respect to portion Q1. Projector 30 can be a pico-projector, for example, using solid-state light sources and some type of beam modulation, such as from a micromirror array or Digital Light Processing (DLP) device from Texas Instruments, for example. Lenses or other devices convert spatial information of the image to angular information in the form of an angularly related set of beams. In order to allow the use of the pico-projector and other compact devices as projector 30, embodiments of the present disclosure employ an optical coupler 40 that redirects light from projector axis A3 to waveguide input axis 26.

With respect to FIG. 1, the function of optical coupler 40 can be appreciated: the incident light to waveguide 20 along axis 26 must be at acute angle cv2 with respect to the portion Q1 waveguide 20 that lies between input and output apertures 22 and 24, respectively. However, as FIG. 1 shows, axis A3 from projector 30 is at an obtuse angle, skewed in the opposite direction.

In order to properly redirect this light, optical coupler 40 can have a number of possible configurations. The top view schematic diagram of FIG. 3A shows an optical coupler 40 having two non-parallel reflective surfaces 42a and 42b.

These surfaces are planar in the embodiment that is shown; some curvature could be provided.

Figure 3B:
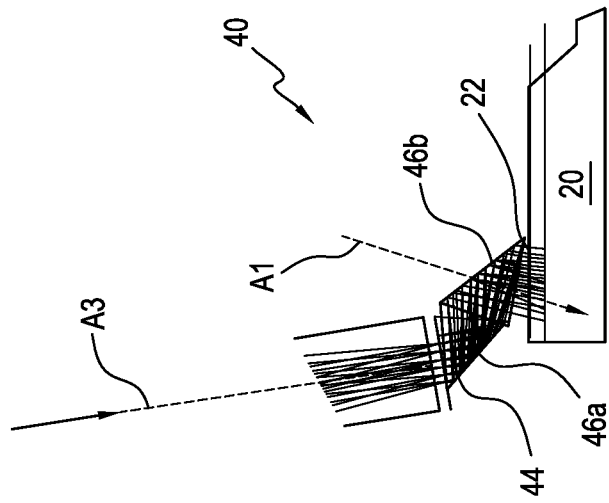
FIG. 3B is a top view of an input section of a waveguide showing an optical coupler formed as a prism.
Figure 3A:
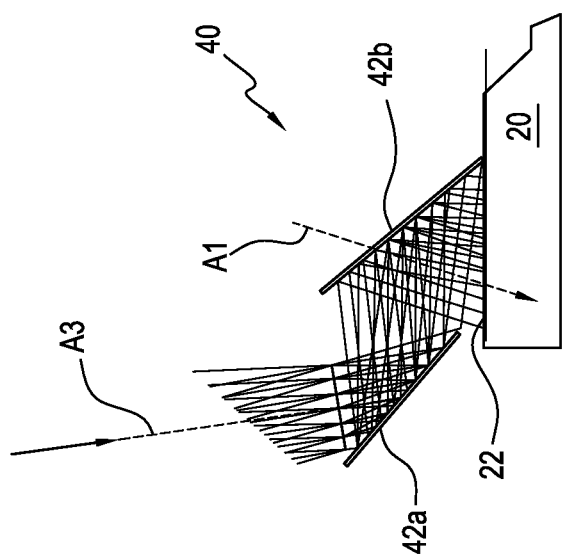
FIG. 3A is a top view of the input section of a waveguide showing an optical coupler formed from two reflective surfaces.

The top view of FIG. 3B shows an optical coupler 40 arranged as a prism 44 having two reflective surfaces 46a and 46b. Prism 44 is advantaged over the FIG. 3A embodiment due to the effective shortening of the optical path that allows less spreading of the projected light.

Figure 3C:
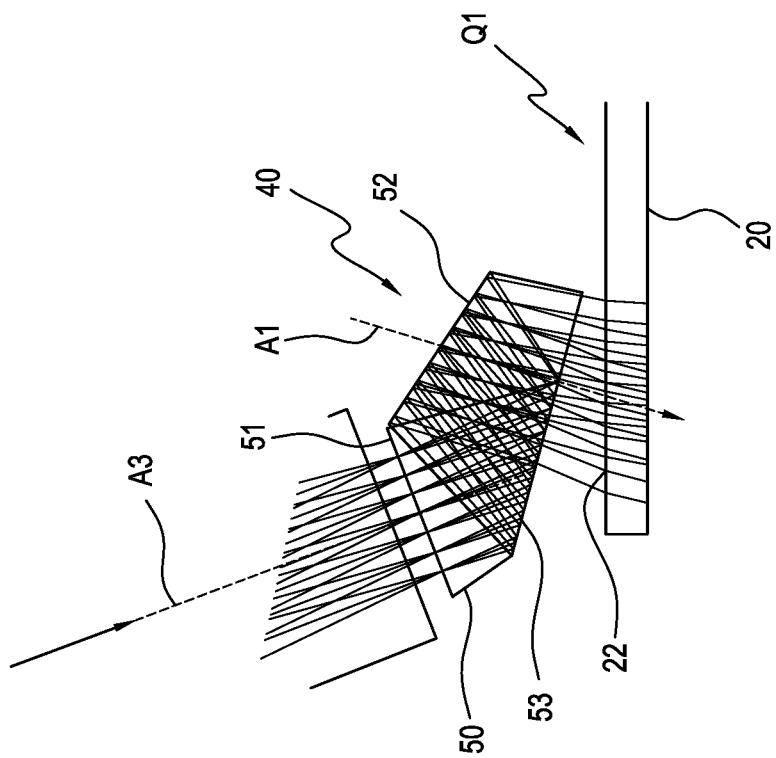
FIG. 3C is an enlarged a top view of an input aperture of a waveguide showing reflections from the surfaces of a prismatic optical coupler.

The top view of FIG. 3C shows an optical coupler 40 arranged as a prism 50 having a single reflective surface 52 that is coated or otherwise treated to be reflective. Incident light propagating along first axis A3 is oriented at an obtuse angle with respect to the portion QI of the waveguide that lies between the input aperture 22 and the output aperture. The axis A3 is substantially orthogonal to an incident surface 51 of the prism 50. Exiting light along the second axis AI is substantially orthogonal to an output surface 53 of the prism 50 and is oriented at an acute input angle relative to portion QI of waveguide 20 that lies between input aperture 22 and the output aperture, as described previously with reference to FIGS. 1-2C.

Prism 50 of FIG. 3C is configured to reflect the image bearing light beams twice, once using TIR from output surface 53 and once from reflective surface 52. For prism embodiments, such as those shown in FIGS. 3B and 3C, an optical material having a high index of refraction is advantaged for bending the light within a limited space and for shortening the optical path distance to reduce spreading of the projected light beam.

In each of the embodiments shown in FIGS. 3A-3C, the optical coupler 40 receives incident light along first axis A3 that is at an obtuse angle with respect to the portion Q1 of the waveguide that lies between the input aperture 22 and the output aperture. However, light output from the optical coupler 40 is directed along an axis Al that is at the appropriate angle for directing the light to the observer's eye from the waveguide 20.

Figure 4:
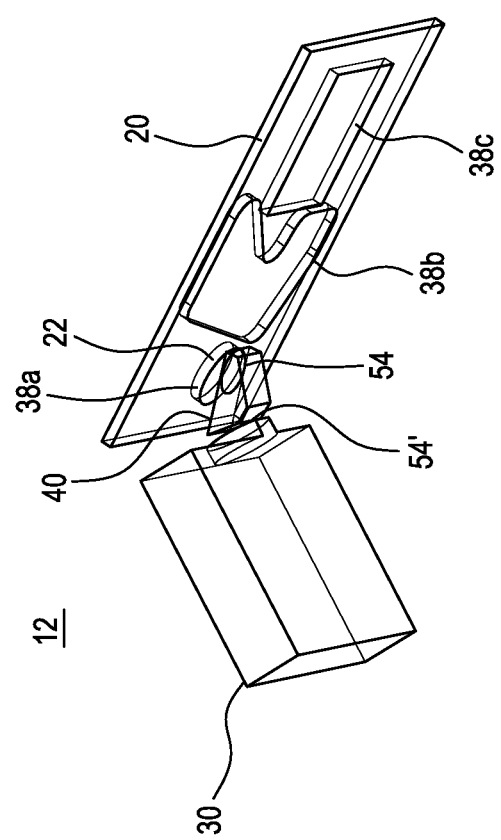
FIG. 4 is a perspective view showing components of an optical apparatus for generating a virtual image.

The perspective view of FIG. 4 shows, from the observer side, the optical apparatus 12 for generating a virtual image for the left eye. In the embodiment shown, waveguide 20 has three embedded gratings 38a, 38b, and 38c that provide optical path translation and pupil enlargement.

Projector Optics Design

Modern projectors, using a variety of display technologies, can be found in a form factor that is fairly compact, have a pupil size comparable to the entrance aperture of an optical waveguide, and have the brightness required to provide a reasonably bright image. However, within the projection optics of these projectors there is often a stop (this can be a physical aperture or a lens aperture acting as a stop) within the lens system. This means that the ray bundles for each field point in the virtual image are diverging before they reach the last outermost lens surface. The ray bundles originating from the corners of the image generator are often clipped (vignetted) and continue to diverge as they leave the projection optics. The further removed from the waveguide, the more divergence there is in the ray bundles. With this problem in mind, an embodiment of the present disclosure provides further advantages for HMD imaging with improvements to projector optics design.

In embodiments of the present disclosure, the stop is positioned at or beyond the last optical surface that emits the projected image-bearing light beam. Methods for suitably positioning the stop in an optical apparatus in this manner are well known to those skilled in the optical design arts. For optical apparatus 12 in HMD 10, this design feature constrains the beam width of light that is delivered to the optical coupler 40 and enables the coupler 40 to be more compact.

With reference to the perspective view of FIG. 4, a stop 54' is conventionally provided within the projection optics. Embodiments of the present disclosure are designed to position a stop 54 forward of the projection lens, so that the optical coupler 40 can re-position stop 54 substantially at the input aperture 22 of waveguide 20. By "substantially at the input aperture 22" is meant at least forward of exit surface 53 of prism 50 or otherwise beyond the exit aperture of optical coupler 40.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Waveguide Fabrication

Various processes can be used to fabricate and assemble the waveguides. In-coupling diffractive optics and out-coupling diffractive optics 110 and 120 can be formed at the respective input and output apertures 22 and 24 in a form such as diffraction gratings or as volume holograms. At least one of the in-coupling and out-coupling diffractive optics 110 and 120 can be a surface relief diffraction grating. A so-called turning optic can be formed along the waveguide between in in-coupling and out-coupling diffractive optics as another diffractive optic or as a reflective structure to provide for beam expansion. The waveguide substrate of the imaging light guide is a transparent optical material, typically glass or optical polymer material with sufficient index of refraction for supporting TIR transmission between in-coupling diffractive optic, turning grating, and out-coupling diffractive optic.

Typically the grating pitch, or grating period, is a value from 75 to about 90 percent of the central wavelength for a color channel. For example, the in-coupling diffractive optic 110 for the red channel (620-670 nm), in an exemplary embodiment, has a period of 510 nm, a depth of 205 nm, 50/50 fill, and a 45-degree slant. After proper surface preparation of a glass substrate blank, the diffraction components can be formed on outer surfaces of the waveguide substrate S using nano-imprinting methods, for example.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A head-mounted imaging apparatus having a frame that houses at least one imaging apparatus, the at least one imaging apparatus being energizable to form a virtual image to an eye of a wearer, wherein the at least one imaging apparatus comprises:
   a projector energizable to emit a set of angularly related beams including a central projected light beam along a projection axis;
   a planar waveguide made of transparent material and having two planar surfaces through which the wearer's eye is provided with a view of an ambient environment and configured to receive the set of angularly related beams including the central projected light beam through an in-coupling optic in one of the planar surfaces and to support propagation of the angularly related beams including the central projected light beam along the planar waveguide from the in-coupling optic to an out-coupling optic in one of the planar surfaces by total internal reflection between the two planar surfaces; and
   an optical coupler that is configured to receive the set of angularly related beams including the central projected light beam from the projector along a first axis, wherein the optical coupler is further configured to redirect the central projected light beam from the optical coupler to the in-coupling optic of the planar waveguide along a second axis,
   wherein the central projected light beam is redirected through the out-coupling optic along a third axis that is at an acute angle with respect to the planar surfaces as measured between the third axis and the portion of the planar waveguide between the in-coupling optic and the out-coupling optic on the wearer side of the planar waveguide.

2. The head-mounted imaging apparatus of claim 1 wherein the optical coupler includes two at least partially reflective and non-parallel surfaces for reflecting the central projected light beam.

3. The head-mounted imaging apparatus of claim 2 wherein the two at least partially reflective and non-parallel surfaces are planar surfaces.

4. The head-mounted imaging apparatus of claim 3 wherein the one of the at least partially reflective surfaces is arranged to reflect the central projected light beam within one range of incidence angles and to transmit the central projected light beam within a second range of incidence angles.

5. The head-mounted imaging apparatus of claim 4 wherein the other of the at least partially reflective surfaces is arranged to reflect the central projected light beam within both ranges of incidence angles.

6. The head-mounted imaging apparatus of claim 1 wherein the optical coupler is a prism.

7. The head-mounted imaging apparatus of claim 6 in which the prism includes an input surface orthogonal to the first axis and an output surface orthogonal to the second axis.

8. The head-mounted imaging apparatus of claim 6 in which the prism includes first and second non-parallel surfaces, wherein the first non-parallel surface is arranged with respect to the second non-parallel surface to reflect the central projected light beam toward the second non-parallel surface and to transmit the central projected light beam reflected from the second non-parallel surface out of the prism.

9. The head-mounted imaging apparatus of claim 1 wherein the projector has an optical stop and the optical coupler is arranged to reposition the stop substantially at the in-coupling optic of the planar waveguide.

10. The head-mounted imaging apparatus of claim 1 wherein the in-coupling optic and the out-coupling optic are diffractive optics.

11. The head-mounted imaging apparatus of claim 1 wherein the projector is supported by a temple member of the frame and includes optics for converting spatial information about an image into the set of angularly related beams for encoding a virtual image.

12. The head-mounted imaging apparatus of claim 1 wherein the first axis is at an obtuse angle with respect to the planar surfaces as measured between the first axis and a portion of the planar waveguide between the in-coupling optic and the out-coupling optic on the wearer side of the planar waveguide.

13. The head-mounted imaging apparatus of claim 1 wherein the second axis is at an acute angle with respect to the planar surfaces as measured between the second axis and the portion of the planar waveguide between the in-coupling optic and the out-coupling optic on the wearer side of the planar waveguide.

14. The head-mounted imaging apparatus of claim 13 wherein the second axis and the third axis converge together on the wearer side of the planar waveguide.

15. The head-mounted imaging apparatus of claim 1 wherein the at least one imaging apparatus comprises a left-eye imaging apparatus and a right-eye imaging apparatus.

16. The head-mounted imaging apparatus of claim 1 wherein the planar waveguide accepts and outputs the set of angularly related beams including the central projected light beam through the planar surface on the wearer side.

* * * * *